United States Patent [19]

Press et al.

[11] 4,296,804
[45] Oct. 27, 1981

[54] CORROSION RESISTANT HEAT EXCHANGER ELEMENT AND METHOD OF MANUFACTURE

[75] Inventors: Irving D. Press, West Orange; Harvey R. Nickerson, Roseland; Helm Rink, North Haledon, all of N.J.

[73] Assignee: Resistoflex Corporation, N.J.

[21] Appl. No.: 52,759

[22] Filed: Jun. 28, 1979

[51] Int. Cl.³ .......................... F28F 9/16; F28F 19/04
[52] U.S. Cl. ................................... 165/133; 29/157.4; 165/173; 165/178; 165/180; 285/158
[58] Field of Search ................. 165/180, 133, DIG. 8, 165/178, 173; 285/256, 259, 158; 29/157.4

[56] References Cited

U.S. PATENT DOCUMENTS

| | | | |
|---|---|---|---|
| 1,901,143 | 3/1933 | Brunner | 285/256 |
| 2,704,074 | 3/1955 | Butler | 285/256 |
| 2,800,145 | 7/1957 | Peierls et al. | 285/256 |
| 3,050,786 | 8/1962 | St. John et al. | 165/180 |
| 3,794,360 | 2/1974 | Bachle et al. | 285/256 |
| 4,193,180 | 3/1980 | Press | 165/133 |

FOREIGN PATENT DOCUMENTS

2425373 12/1975 Fed. Rep. of Germany ...... 285/256
2824453 12/1978 Fed. Rep. of Germany ...... 285/256

*Primary Examiner*—Sheldon J. Richter
*Attorney, Agent, or Firm*—Watson, Leavenworth, Kelton & Taggart

[57] ABSTRACT

A heat exchanger element is provided with small-bore copper tubing jacketed with perfluoroalkoxy resin wherein the ends of the jacketed copper tubing are each telescoped over the end of a stainless steel nipple having a raised shoulder at its end and an annular groove adjacent thereto. A stainless steel ferrule surrounding a sleeve of polytetrafluoroethylene overlies the joint and for a short distance to either side and is contracted particularly in the region of said nipple groove to squeeze the copper tubing thereinto behind said shoulder. This interlocks the tube with the nipple and establishes a fluid-tight seal between the ferrule, the nipple and the metal tube. The nipples are joined to headers or manifolds by welding or in similar manner.

12 Claims, 2 Drawing Figures

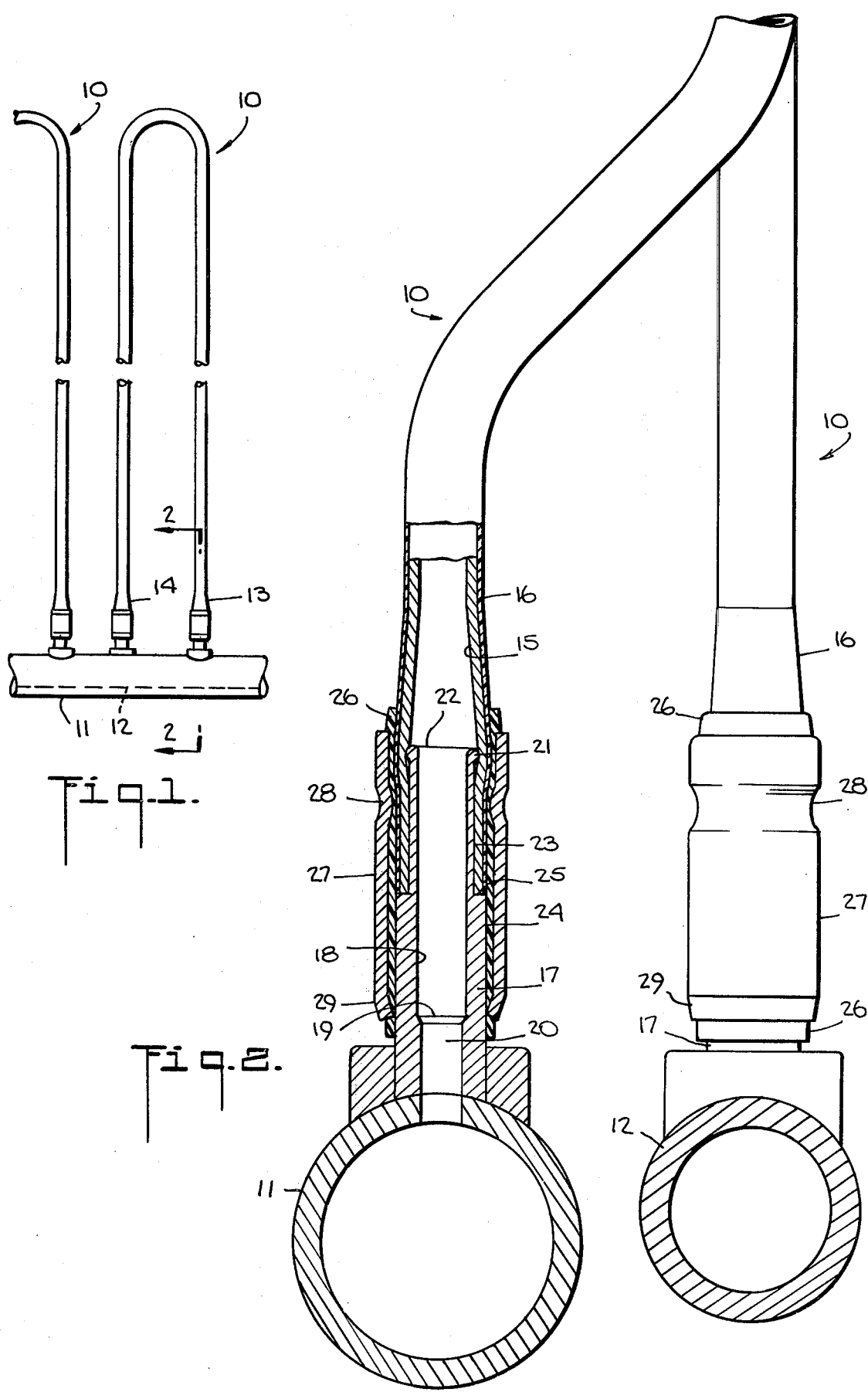

CORROSION RESISTANT HEAT EXCHANGER ELEMENT AND METHOD OF MANUFACTURE

BACKGROUND OF THE INVENTION

The present invention relates to plastic coated structures generally and more specifically to heat exchangers for use in a corrosive environment and to the method of manufacture thereof.

In the copending application of Irving D. Press, Ser. No. 773,750, filed Mar. 2, 1977, for "PLASTIC COATED STRUCTURE AND METHOD", now U.S. Pat. No. 4,193,180 entitled "Method of Forming a Heat Exchanger", and assigned to the same assignee as the present application, there is described a method for producing a heat exchanger having a series of small diameter tubes radiating from a manifold or header, all of which is coated with a protective layer of plastic. In fabricating the heat exchanger the tubes are jacketed throughout their length with a fluorocarbon resin by extruding the resin directly thereon. After cutting back the jacket for a short distance from an end of the tube, said tube end is joined to the manifold by brazing. Thereafter, the joint, the exposed surfaces of said tube between said joint and the adjacent end of the jacket, a narrow circumferential band of the jacket at said adjacent end of the jacket, and the manifold are coated with the same resin by spraying in dry powder form and then applying heat to fuse the sprayed on resin. It has been found, however, that such process of dry powder coating the manifold and joints is expensive to practice.

As explained in said prior application, the construction of a heat exchanger for operation in a corrosive environment necessitates balancing conflicting design requirements. Optimally, the heat exchanger tubes are constructed of material having maximum heat transmittance with adequate structural strength, minimum wall thickness and resistance to chemical attack by the media to be encountered both within and without. Structural strength requirements are determined by internal and external fluid pressures as well as beam loads due to the deadweight of the tubes and dynamic loads from motion in the form of vibration or acceleration or both. A good compromise is to use a metal tube externally coated or jacketed with a corrosion resistant material. Heat exchanger tubes made entirely of fluorinated ethylene propylene (FEP) resin are known and such resin is suitable as an exterior coating for the foregoing purpose. Also suitable are polyvinylidene fluoride ($PVF_2$) and perfluoroalkoxy (PFA) resins. The problem sought to be solved by the invention disclosed in said prior application was to obtain a complete encasement of the metal of the heat exchanger, not only that of the tubes but the metal of the associated manifolds or the like, free from pinholes yet sufficiently thin so as not to cause inefficient heat transfer.

With the foregoing in mind, it is an object of the present invention to provide an alternative construction for the heat exchanger structure with has equivalent corrosion resistant integrity but is much less costly to fabricate. In general, said object has been achieved by forming the manifolds of headers from stainless steel or other corrosion resistant material and effecting a suitable corrosion resistant joint between copper tube heat exchange elements and said manifolds.

A further object of the present invention is to achieve a reliable, corrosion resistant junction between the resin coated small-bore heat exchange tubes and the uncoated, inherently corrosion resistant, manifold or header tubes. While not limited thereto, the specific example disclosed in the prior application and disclosed herein relates to a heat exchanger element in which the heat exchange tubes prior to jacketing have an outside diameter of the order of 0.125 inches and an inside diameter of the order of 0.085 inches. As with the prior application, the copper tubes are jacketed by extruding directly thereupon a coating of PFA resin to a thickness of about 5 mils. The manifold or header tubes have, for example, an outside diameter between ⅜ths and ½ inches.

In accordance with one aspect of the present invention, there is provided a heat exchanger element for use in a corrosive environment comprising a metal tube jacketed with an extruded layer of a given fluorocarbon resin having a thickness within the limits affording efficient heat transfer combined with resistance to corrosion of said tube, said given resin being of the type which has a high viscosity in the melt stage, a nipple of corrosion resistant metal, said nipple having a first end with a circumferential shoulder at said end and an axial region adjacent said shoulder which region has a lesser diameter than said shoulder providing an undercut annular groove therebehind, said first end of said nipple being telescopingly engaged within an end of said metal tube and having an opposite end which projects from said metal tube, a sleeve of fluorocarbon resin surrounding said end of said metal tube and at least a portion of said opposite end of said nipple, said sleeve extending over said metal tube to a point beyond the location of said shoulder, and a corrosion resistant metal ferrule surrounding said sleeve of resin and substantially coextensive, said ferrule being contracted radially squeezing said metal tube at least within said axial region behind said shoulder thereby effecting interlocking engagement between said metal tube and said nipple and establishing a fluid-tight seal between said ferrule, said nipple and said metal tube.

In accordance with a further aspect of the present invention, there is provided a method for fabricating the structure described above.

BRIEF DESCRIPTION OF THE DRAWINGS

The invention will be better understood after reading the following detailed description of the presently preferred embodiment thereof with reference to the appended drawings in which:

FIG. 1 is a fragmentary plan view of a typical heat exchanger element in grid form constructed in accordance with the present invention; and FIG. 2 is a fragmentary sectional view drawn to a greatly enlarged scale taken along the line 2—2 in FIG. 1.

DESCRIPRTION OF THE PREFERRED EMBODIMENT

Reference should now be had to the drawings wherein the same reference numerals are used throughout to designate the same or similar parts. In FIG. 1 there is illustrated a typical heat exchanger element consisting of a plurality of heat exchanger tubes 10 interconnected at their ends with manifolds 11 and 12, all in accordance with the present invention. In this exemplary embodiment, the heat exchanger tubes 10 are formed into loops with one end 13 joined to manifold 11 and the opposite end 14 joined to manifold 12. The details of the manifold connections are best seen in FIG.

2. It should be understood that the complete heat exchanger element will have an array of tubes 10 joined to the manifolds and that the configuration of the tubes may vary from one to another as well as the spacing therebetween depending upon factors having no bearing upon the present invention.

As seen in FIG. 2, the metal heat exchanger tube element 10 consists of a length of copper tubing 15 over which has been extruded a thin layer 16 of PFA resin to a thickness of approximately 0.005 inches. A nipple 17 of corrosion resistant metal, e.g., stainless steel, is joined to the manifold 11 or 12 by welding using a conventional stud welding gun. In the preferred method of fabrication, the nipple 17 is provided with the counterbore 18 extending down to the point 19, the remainder of the nipple being left solid until after it is joined by welding to the appropriate manifold. Thereupon, the nipple is drilled to provide the bore 20, and the drilling is continued right through the wall of the associated manifold.

As seen in the drawing, the nipple 17 is provided with a circumferential shoulder 21 at its outer end 22 and with an axial region 23 adjacent shoulder 21 which region has a lesser diameter than the shoulder 21 providing thereby an undercut annular groove 23 behind said shoulder. It is presently preferred that the height of the shoulder 21 above the axial region or groove 23 be on the order of 0.0025 inches. The O.D. of the region or groove 23 may be approximately 0.114 inches, while the O.D. of the nipple 17 in the region 24 is about 0.162 inches. Such dimensions have been found suitable when the I.D. of the tube 15 is about 0.085 inches. The total axial length of the groove 23 and shoulder 21 may be about 0.250 inches.

As seen in FIG. 2, the end of the tube 10 has been enlarged radially to telescope with a sliding fit over the shoulder 21 onto the nipple 17 up to the shoulder or stop 25. The PFA coating 16 remains intact throughout the full length of the tube 15.

Having previously disposed the plastic sleeve 26 and metal ferrule 27 on the coated tube 10, the sleeve 26 and ferrule 27 are now positioned over the joint in the relative locations shown in FIG. 2. Thereupon, radial swaging dies are employed to contract the ferrule 27 preferably throughout its length and to a greater extent in the region 28 and at its end 29. The contraction of the ferrule in the region 28 functions to squeeze the tube 10 within the axial region 23 behind the shoulder 21 thereby effecting interlocking engagement between the tube 10 and the nipple 17. The overall contraction of ferrule 27 establishes a seal via sleeve 26 between ferrule 27, nipple 17 and the tube 10. The amount of contraction in the area 28 is preferably controlled so as not to penetrate the plastic sleeve 26. At the end 29 the contracting is preferably sufficient to prevent extrusion of sleeve 26 and, in fact, the ferrule 27 may be brought into actual contact at this location with nipple 17. The plastic sleeve 26 preferably is formed from polytetrafluoroethylene with a wall thickness of about 15 mils, while the ferrule 27 may be formed from stainless steel with a thickness of about 25 mils. Both ends of the tube 10 are joined to the respective manifolds 11 and 12 in similar fashion.

It should now be appreciated that in a single simple assembly operation the plastic coated small-bore tubes of copper are joined to the corrosion resistant stainless steel nipples previously welded to the manifold elements 11 and 12.

Having described the presently preferred embodiment of the subject invention with reference to the appended drawings, it will be understood that various changes in detail will occur to those skilled in the art and such changes are intended to be encompassed as will fall within the true scope of the invention as defined in the appended claims.

What is claimed is:

1. A heat exchanger element for use in a corrosive environment comprising a metal tube jacketed at least over a substantial portion of its length including at least one end with an extruded layer of a given fluorocarbon resin having a thickness within the limits affording efficient heat transfer combined with resistance to corrosion of said tube, said given resin being of the type which has a high viscosity in the melt stage, a nipple of corrosion resistant metal, said nipple having a first end with a circumferential shoulder thereat and an axial region adjacent said shoulder which region has a lesser diameter than said shoulder providing an undercut annular groove therebehind, said first end of said nipple being telescopingly engaged within said one end of said metal tube, and said nipple having an opposite end which projects from said one end of said metal tube, a sleeve of fluorocarbon resin surrounding said one end of said metal tube and at least a portion of said opposite end of said nipple, said sleeve extending over said metal tube and its jacket layer of resin to a point beyond the location of said nipple shoulder, and a corrosion resistant metal ferrule surrounding said sleeve of resin and being substantially coextensive therewith, said ferrule being contracted radially squeezing said metal tube within said axial region behind said nipple shoulder thereby effecting interlocking engagement between said metal tube and said nipple and establishing a fluid-tight seal between said ferrule, said nipple, said metal tube and the intervening resin material.

2. A heat exchanger element according to claim 1, wherein said metal tube is formed from copper.

3. A heat exchanger element according to claim 2, wherein said corrosion resistant metal is stainless steel.

4. A heat exchanger element according to claim 3, wherein said sleeve of fluorocarbon resin has a wall thickness on the order of 15 mils and consists essentially of polytetrafluoroethylene.

5. A heat exchanger element according to claim 4, wherein said metal ferrule consists essentially of stainless steel and has a wall thickness on the order of 25 mils.

6. A heat exchanger element according to claim 5, wherein the height of said shoulder above said axial region is on the order of 0.0025 inches.

7. A heat exchanger element according to claim 6, wherein said metal tube has outside and inside diameters of about 0.125 inches and 0.085 inches, respectively.

8. A heat exchanger element according to claim 2, wherein the height of said shoulder above said axial region is on the order of 0.0025 inches.

9. A heat exchanger element according to claim 8, wherein said metal tube has outside and inside diameters of about 0.125 inches and 0.085 inches, respectively.

10. A heat exchanger element according to claim 2, wherein said sleeve of fluorocarbon resin has a wall thickness on the order of 15 mils and consists essentially of polytetrafluoroethylene.

11. A heat exchanger element according to claim 10, wherein said metal ferrule consists essentially of stainless steel and has a wall thickness on the order of 25 mils.

12. A method of fabricating a heat exchanger element which comprises the steps in combination of selecting a metal tube which has been jacketed with an extruded layer of a given fluorocarbon resin having a thickness within the limits affording efficient heat transfer combined with resistance to corrosion of said tube, said given resin being of the type which has a high viscosity in the melt stage, selecting a nipple of corrosion resistant metal with a first end with a circumferential shoulder at said end and an axial region adjacent said shoulder which region has a lesser diameter than said shoulder providing an undercut annular groove therebehind, disposing on said tube a corrosion resistant metal ferrule and a sleeve of fluorocarbon resin, telescopingly engaging said first end of said nipple within an end of said metal tube with the opposite end of said nipple projecting from said metal tube, positioning said sleeve of fluorocarbon resin along with said metal ferrule concentrically disposed thereabout at the junction between said nipple and said metal tube so as to extend over at least a portion of said opposite end of said nipple and over said metal tube to a point beyond the location of said shoulder, and contracting said metal ferrule at least in the vicinity of said axial region to compress said metal tube and contract the same behind said shoulder to interlock said tube and said nipple and squeeze said sleeve of resin to establish a fluid-tight seal between said ferrule, said nipple and said metal tube.

* * * * *